US012587516B2

(12) United States Patent
Layouni et al.

(10) Patent No.: US 12,587,516 B2
(45) Date of Patent: Mar. 24, 2026

(54) SECURE RDMA FOR LOW-LATENCY REAL-TIME APPLICATIONS

(71) Applicant: GM GLOBAL TECHNOLOGY OPERATIONS LLC, Detroit, MI (US)

(72) Inventors: Mohamed A. Layouni, Fraser, MI (US); Markus Jochim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 18/635,825

(22) Filed: Apr. 15, 2024

(65) Prior Publication Data

US 2025/0323903 A1       Oct. 16, 2025

(51) Int. Cl.
H04L 9/40          (2022.01)

(52) U.S. Cl.
CPC .................................... H04L 63/08 (2013.01)

(58) Field of Classification Search
CPC .............................. H04L 63/08; H04L 63/123
See application file for complete search history.

(56) References Cited

U.S. PATENT DOCUMENTS

| | | | | |
|---|---|---|---|---|
| 6,701,434 B1 * | 3/2004 | Rohatgi | ................. | G06Q 40/04 |
| | | | | 713/156 |
| 7,107,359 B1 * | 9/2006 | Burton | ................. | H04L 49/358 |
| | | | | 710/305 |
| 8,102,769 B1 * | 1/2012 | Pearson | ............. | H04L 67/1097 |
| | | | | 370/231 |

| | | | | |
|---|---|---|---|---|
| 8,458,462 B1 * | 6/2013 | Hanna | ..................... | H04L 63/10 |
| | | | | 726/10 |
| 8,683,572 B1 * | 3/2014 | Mahalingaiah | ....... | H04L 63/126 |
| | | | | 726/10 |
| 10,099,637 B1 * | 10/2018 | Akella | .................. | B60R 16/037 |
| 10,392,007 B1 * | 8/2019 | Brown | ................... | A01B 69/00 |
| 10,940,832 B1 * | 3/2021 | Hardenia | ............... | B60R 25/32 |
| 10,963,407 B1 * | 3/2021 | Tsirkin | ................... | H04L 45/74 |
| 11,036,221 B1 * | 6/2021 | Lyle | ..................... | G05D 1/0088 |
| 11,599,649 B2 * | 3/2023 | Batcher | ................ | G06F 21/606 |
| 11,902,146 B1 * | 2/2024 | Montgomery | ........ | H04L 45/122 |
| 11,909,628 B1 * | 2/2024 | Friedman | ............. | H04L 45/124 |

(Continued)

FOREIGN PATENT DOCUMENTS

DE        102021207514 A1        3/2022

*Primary Examiner* — Aravind K Moorthy
(74) *Attorney, Agent, or Firm* — Ingrassia Fisher & Lorenz, LLP | IF&L

(57)            ABSTRACT

A vehicle network communications system including a sending processor for generating a data in response to a first vehicle control algorithm, a sending network interface configured to receive the data from the sending processor, to generate a message authentication code in response to the data, to generate a communications packet for transmission according to a remote direct memory access network protocol, wherein the message authentication code is appended to the communications packet, and to transmit the communications packet via a communications network, a receiving network interface configured to receive the communications packet from the sending network interface via the communications network, to decode the message authentication code to extract the data, and to couple the data the memory, and a memory configured to store the data for use by a receiving processor performing a second vehicle control algorithm.

20 Claims, 4 Drawing Sheets

(56) References Cited

U.S. PATENT DOCUMENTS

| 11,946,515 | B1* | 4/2024 | Hashemi | F16H 48/34 |
|---|---|---|---|---|
| 12,008,259 | B1* | 6/2024 | Petersen | G06F 3/067 |
| 12,037,001 | B1* | 7/2024 | Bacchiani | B60W 40/072 |
| 12,444,201 | B2* | 10/2025 | Tusch | G06Q 30/0252 |
| 12,497,055 | B2* | 12/2025 | Bielby | B60W 50/0205 |
| 12,499,073 | B2* | 12/2025 | Pope | G06F 9/45558 |
| 2002/0191790 | A1* | 12/2002 | Anand | H04L 9/0643 |
| | | | | 380/255 |
| 2002/0191793 | A1* | 12/2002 | Anand | H04L 63/0485 |
| | | | | 380/255 |
| 2006/0007926 | A1* | 1/2006 | Zur | H04L 12/66 |
| | | | | 370/389 |
| 2006/0095772 | A1* | 5/2006 | Bell | H04L 63/0823 |
| | | | | 713/171 |
| 2007/0014411 | A1* | 1/2007 | Ghosh | H04L 9/3228 |
| | | | | 380/277 |
| 2007/0038855 | A1* | 2/2007 | Brown | H04L 63/08 |
| | | | | 713/161 |
| 2007/0088469 | A1* | 4/2007 | Schmiedel | G05D 1/0274 |
| | | | | 701/23 |
| 2008/0043732 | A1* | 2/2008 | Desai | H04L 67/1097 |
| | | | | 370/389 |
| 2008/0046039 | A1* | 2/2008 | Corndorf | H04L 63/0853 |
| | | | | 607/60 |
| 2008/0127227 | A1* | 5/2008 | Aloni | G06F 9/4555 |
| | | | | 719/321 |
| 2008/0222414 | A1* | 9/2008 | Wang | H04L 9/3239 |
| | | | | 713/161 |
| 2008/0244739 | A1* | 10/2008 | Liu | H04L 63/1466 |
| | | | | 726/22 |
| 2009/0181643 | A1* | 7/2009 | Thakare | H04W 12/06 |
| | | | | 455/411 |
| 2009/0316900 | A1* | 12/2009 | Qiu | H04L 9/083 |
| | | | | 380/258 |
| 2010/0157890 | A1* | 6/2010 | Tian | H04L 63/123 |
| | | | | 370/328 |
| 2010/0177789 | A1* | 7/2010 | Chen | H04L 63/20 |
| | | | | 370/477 |
| 2012/0243541 | A1* | 9/2012 | Zhao | H04L 47/00 |
| | | | | 370/392 |
| 2012/0287944 | A1* | 11/2012 | Pandit | H04L 69/22 |
| | | | | 709/212 |
| 2013/0080562 | A1* | 3/2013 | Fox | H04L 67/14 |
| | | | | 709/227 |
| 2014/0281536 | A1* | 9/2014 | Livolsi | H04L 9/14 |
| | | | | 713/168 |
| 2014/0351950 | A1* | 11/2014 | Sakemi | H04W 12/126 |
| | | | | 726/26 |
| 2016/0212214 | A1* | 7/2016 | Rahman | H04L 47/6295 |
| 2016/0323741 | A1* | 11/2016 | Lee | H04W 12/06 |
| 2017/0026349 | A1* | 1/2017 | Smith | H04L 45/38 |
| 2017/0041297 | A1* | 2/2017 | Ling | H04L 63/164 |
| 2017/0075855 | A1* | 3/2017 | Sajeepa | G06F 15/17331 |
| 2017/0127264 | A1* | 5/2017 | Yang | H04L 63/0428 |
| 2017/0213093 | A1* | 7/2017 | Li | G06F 18/2414 |
| 2017/0286363 | A1* | 10/2017 | Joshua | G06F 3/061 |
| 2018/0364730 | A1* | 12/2018 | Dvonch | G05D 1/0242 |
| 2019/0044728 | A1* | 2/2019 | Karmoose | H04L 9/30 |
| 2019/0079896 | A1* | 3/2019 | Srivastava | G06F 15/167 |
| 2019/0102568 | A1* | 4/2019 | Hausauer | H04L 9/3242 |
| 2019/0141041 | A1* | 5/2019 | Bhabbur | H04L 9/3242 |
| 2019/0141548 | A1* | 5/2019 | Burt | H04W 88/12 |
| 2019/0196465 | A1* | 6/2019 | Hummelshøj | B60W 60/0015 |
| 2019/0196468 | A1* | 6/2019 | Liu | G01C 21/3635 |
| 2019/0268149 | A1* | 8/2019 | Kariv | H04L 9/0897 |
| 2019/0268335 | A1* | 8/2019 | Targali | H04W 12/72 |
| 2019/0268767 | A1* | 8/2019 | Wu | H04L 63/162 |
| 2019/0297015 | A1* | 9/2019 | Marolia | G06F 13/28 |
| 2019/0382029 | A1* | 12/2019 | Golov | G06N 3/0499 |
| 2019/0391587 | A1* | 12/2019 | Uvarov | B60W 60/001 |
| 2020/0084222 | A1* | 3/2020 | William | H04L 63/12 |
| 2020/0193178 | A1* | 6/2020 | Hart | B60Q 1/02 |
| 2020/0209864 | A1* | 7/2020 | Chen | G01C 21/3811 |
| 2020/0210596 | A1* | 7/2020 | Cariello | G06F 21/79 |
| 2020/0257292 | A1* | 8/2020 | Zhao | B60Q 9/00 |
| 2020/0259635 | A1* | 8/2020 | Junk | H04W 12/033 |
| 2020/0293483 | A1* | 9/2020 | Haimzon | G06F 3/0604 |
| 2020/0311014 | A1* | 10/2020 | Epstein | H04L 67/1097 |
| 2020/0311183 | A1* | 10/2020 | Simpson | G08C 17/16 |
| 2020/0320878 | A1* | 10/2020 | Ljung Aust | G08G 1/005 |
| 2020/0331442 | A1* | 10/2020 | Cheon | B60T 8/885 |
| 2020/0403804 | A1* | 12/2020 | Karmoose | H04L 9/0637 |
| 2020/0406860 | A1* | 12/2020 | Mai | B60R 25/31 |
| 2021/0049836 | A1* | 2/2021 | Covington | B60R 16/0234 |
| 2021/0117246 | A1* | 4/2021 | Lal | G06F 9/3814 |
| 2021/0127090 | A1* | 4/2021 | Kale | G06N 3/08 |
| 2021/0146944 | A1* | 5/2021 | Kundu | B60W 50/085 |
| 2021/0168125 | A1* | 6/2021 | Vemulpali | H04L 9/3236 |
| 2021/0200513 | A1* | 7/2021 | Kang | G06F 7/5443 |
| 2021/0334234 | A1* | 10/2021 | Yudanov | G06F 9/5016 |
| 2022/0026912 | A1* | 1/2022 | Wu | B60W 30/02 |
| 2022/0052957 | A1* | 2/2022 | Sloane | H04L 9/085 |
| 2022/0060417 | A1* | 2/2022 | Kfir | H04L 45/66 |
| 2022/0103536 | A1* | 3/2022 | Kida | H04L 63/0485 |
| 2022/0135026 | A1* | 5/2022 | Schleede | B60W 60/0027 |
| | | | | 701/26 |
| 2022/0227379 | A1* | 7/2022 | Robinson | G06N 3/0442 |
| 2022/0242401 | A1* | 8/2022 | Thompson | G06F 1/14 |
| 2022/0274603 | A1* | 9/2022 | Karve | G06N 3/047 |
| 2022/0391348 | A1* | 12/2022 | Cardona | H04L 45/66 |
| 2023/0048365 | A1* | 2/2023 | Saxena | G06V 20/56 |
| 2023/0079725 | A1* | 3/2023 | Lee | H04L 12/40 |
| | | | | 726/25 |
| 2023/0080379 | A1* | 3/2023 | Rider | G06N 20/00 |
| | | | | 706/12 |
| 2023/0096468 | A1* | 3/2023 | Ong | H04L 47/2441 |
| | | | | 370/235 |
| 2023/0129746 | A1* | 4/2023 | Hakimi | G16H 10/20 |
| | | | | 705/2 |
| 2023/0133329 | A1* | 5/2023 | Sung | B60W 60/001 |
| | | | | 701/27 |
| 2023/0192112 | A1* | 6/2023 | Merg | B60W 50/085 |
| | | | | 701/1 |
| 2023/0244819 | A1* | 8/2023 | Mishra | G06F 21/72 |
| | | | | 713/189 |
| 2023/0252824 | A1* | 8/2023 | Merg | G07C 5/006 |
| | | | | 701/29.4 |
| 2023/0281604 | A1* | 9/2023 | Robell | G06Q 30/018 |
| 2023/0289453 | A1* | 9/2023 | Hendrickson | G06F 21/602 |
| 2023/0300063 | A1* | 9/2023 | Naeimi | H04L 45/16 |
| | | | | 370/390 |
| 2023/0308423 | A1* | 9/2023 | Maraveyas | G06F 21/72 |
| 2023/0311653 | A1* | 10/2023 | Grammatico | G01D 5/24466 |
| | | | | 701/101 |
| 2023/0327963 | A1* | 10/2023 | Khermosh | H04L 41/0897 |
| 2023/0370701 | A1* | 11/2023 | Aluru | B60R 11/04 |
| 2023/0379154 | A1* | 11/2023 | Naeimi | H04L 63/166 |
| 2024/0012769 | A1* | 1/2024 | Guim Bernat | G06F 13/1668 |
| 2024/0031289 | A1* | 1/2024 | Balakrishnan | H04L 45/566 |
| 2024/0080379 | A1* | 3/2024 | Friedman | H04L 69/22 |
| 2024/0087450 | A1* | 3/2024 | Donderici | G08G 1/0112 |
| 2024/0089194 | A1* | 3/2024 | Almog | H04L 45/22 |
| 2024/0089219 | A1* | 3/2024 | Rahman | H04L 49/206 |
| 2024/0105055 | A1* | 3/2024 | Marzorati | G08G 1/0965 |
| 2024/0106750 | A1* | 3/2024 | Suthar | H04L 45/24 |
| 2024/0111414 | A1* | 4/2024 | Chen | G06F 3/0631 |
| 2024/0143515 | A1* | 5/2024 | Chakrabarty | G06F 12/1081 |
| 2024/0143528 | A1* | 5/2024 | Marcovitch | G06F 13/4221 |
| 2024/0144736 | A1* | 5/2024 | Bohman | G07C 5/008 |
| 2024/0168891 | A1* | 5/2024 | Sharma | G06F 12/1027 |
| 2024/0187336 | A1* | 6/2024 | Friedman | H04L 47/122 |
| 2024/0201881 | A1* | 6/2024 | Liu | G06F 3/067 |
| 2024/0220440 | A1* | 7/2024 | Pope | G06F 13/42 |
| 2024/0223353 | A1* | 7/2024 | Raman | H04L 49/3063 |
| 2024/0235841 | A1* | 7/2024 | Osborn | H04L 9/0877 |
| 2024/0256319 | A1* | 8/2024 | Dawkins | G06F 9/45558 |
| 2024/0257070 | A1* | 8/2024 | Merg | G06Q 10/20 |
| 2024/0259330 | A1* | 8/2024 | Pudiyapura | H04L 49/3063 |
| 2024/0291666 | A1* | 8/2024 | Osborn | H04L 9/3228 |
| 2024/0311019 | A1* | 9/2024 | Sehgal | G06F 3/0619 |
| 2024/0312059 | A1* | 9/2024 | Omar | G01S 17/89 |

(56) References Cited

U.S. PATENT DOCUMENTS

| | | | | |
|---|---|---|---|---|
| 2024/0333642 | A1* | 10/2024 | Andrews | H04L 45/24 |
| 2024/0354447 | A1* | 10/2024 | Galles | G06F 21/54 |
| 2024/0367685 | A1* | 11/2024 | Zhao | G06V 10/764 |
| 2024/0372810 | A1* | 11/2024 | Horowitz | H04L 47/11 |
| 2024/0416962 | A1* | 12/2024 | Terechko | B60W 50/0205 |
| 2025/0021515 | A1* | 1/2025 | Wang | G06F 11/0793 |
| 2025/0028951 | A1* | 1/2025 | Bang | G06N 5/022 |
| 2025/0042416 | A1* | 2/2025 | Sen | G06V 20/56 |
| 2025/0042422 | A1* | 2/2025 | Wassef | G07C 5/0808 |
| 2025/0112872 | A1* | 4/2025 | Avnery | H04L 47/6225 |
| 2025/0133134 | A1* | 4/2025 | Voloshin | H04L 67/1097 |
| 2025/0133136 | A1* | 4/2025 | Barak | G06F 13/404 |
| 2025/0145159 | A1* | 5/2025 | Wei | B62D 15/025 |
| 2025/0148906 | A1* | 5/2025 | Ucar | G01C 21/3407 |
| 2025/0164993 | A1* | 5/2025 | Panthri | B60W 30/165 |
| 2025/0211546 | A1* | 6/2025 | Sohan | H04L 67/1097 |
| 2025/0274512 | A1* | 8/2025 | Jochim | H04L 47/22 |
| 2025/0278373 | A1* | 9/2025 | Shicht | G06F 13/28 |
| 2025/0286938 | A1* | 9/2025 | Biradar | H04L 12/4633 |
| 2025/0291958 | A1* | 9/2025 | Kadam | G06F 21/72 |
| 2025/0306800 | A1* | 10/2025 | Singh | G06F 3/0683 |

* cited by examiner

100

200

300

305

315

335

400

SECURE RDMA FOR LOW-LATENCY REAL-TIME APPLICATIONS

INTRODUCTION

The present disclosure relates to computer network security, and in particular, to remote direct memory access (RDMA) technologies. More specifically, aspects of this disclosure relate to systems, methods and devices to enable transporting RDMA transactions over a packet-based network, to provide mechanisms for access control, data integrity and source authentication, denial of service prevention, and use of hardware to implement the above mechanisms efficiently.

As the technology in modern vehicles advances, more and more electronic control units (ECUs) are added to the vehicle to handle the computational workload of these technological features. A modern vehicle can have anywhere from 30 to over 150 ECUs with the number of ECUs depending on the car's complexity and features, with luxury cars often having more than others. ECUs are small computing devices that control specific functions, such as engine and power steering control, or comfort functions, such as power windows, seats, heating, ventilation, and air conditioning (HVAC). ECUs use data from the engine, such as revolutions per minute (RPM), ignition timing, fuel injection rates, and exhaust gas composition, to control the fueling and ignition of the engine. They are distributed throughout the vehicle and are communicatively coupled via a bus such as a controller area network (CAN) or local interconnect network (LIN).

As more and more ECUs are added, issues arise in that most of the computational power of the vehicle goes unused most of the time and the ECU is available to only one function or system. In addition, system updates and the addition of new features may require replacement of an ECU. To address this problem, vehicle manufacturers have begun to investigate the use of computing clusters in vehicles. Computing clusters are systems comprised of multiple interconnected computing nodes, each functioning as an individual computer. These nodes collaborate via a high-speed network to distribute processing tasks and share data, acting as a single, powerful computational resource. This architecture offers significant advantages over standalone computers, enabling parallel processing for tackling complex problems and achieving high performance computing capabilities. In a physically secure network, these computing clusters can distribute data using remote direct memory access (RDMA).

The RDMA standard enables read/write access to the memory of a remote machine without requiring central processing unit (CPU), microcontroller unit (MCU) or system-on-chip (SoC) cycles/resources from the hosts of the local or remote machine. RDMA bypasses the traditional operating system data transfer protocols, enabling direct memory-to-memory communication with minimal CPU overhead. As such, RDMA improves efficiency by reducing processor load and communication latency. However, RDMA was developed for use in trusted environments such as data centers. As a result, security in RDMA was kept to a minimum for the sake of efficiency. While limited security might be acceptable in a trusted environment, lack of security is not acceptable in safety-critical applications such as automotive.

Accordingly, it would be desirable to provide systems, methods and mechanisms to secure RDMA while maintaining its efficiency. More precisely, it would be desirable to provide mechanisms for access control, data integrity and source authentication, denial of service prevention, and use of hardware to implement the above mechanisms efficiently. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are vehicle control systems and methods and related control logic for provisioning vehicle data systems, methods for making and methods for operating such systems, and motor vehicles equipped with distributed computing systems. By way of example, and not limitation, there are presented various embodiments of systems for providing a secure RDMA data packet including a message authentication code appended to a standard RDMA data packet in a motor vehicle data communications system disclosed herein.

In accordance with an exemplary embodiment, a vehicle communications system including a sending processor for generating a data in response to a first vehicle control algorithm, a sending network interface configured to receive the data from the sending processor, to generate a message authentication code in response to the data, to generate a communications packet for transmission according to a remote direct memory access network protocol, wherein the message authentication code is appended to the communications packet, and to transmit the communications packet via a communications network, a receiving network interface configured to receive the communications packet from the sending network interface via the communications network, to decode the message authentication code to extract the data, and to couple the data to a memory, and the memory configured to store the data for use by a receiving processor performing a second vehicle control algorithm.

In accordance with another aspect of the exemplary embodiment of the present disclosure wherein the message authentication code replaces a portion of a remote direct memory access header within the communications packet.

In accordance with another aspect of the exemplary embodiment of the present disclosure wherein the message authentication code replaces a plurality of checksums within the communications packet.

In accordance with another aspect of the exemplary embodiment of the present disclosure wherein the message authentication code is further generated in response to a freshness counter and wherein the receiving network interface is further configured to extract the freshness counter in response to decoding the message authentication code.

In accordance with another aspect of the exemplary embodiment of the present disclosure wherein the message authentication code is generated in response to a first key, a routing header, a base transport header, a remote direct memory access header and the data.

In accordance with another aspect of the exemplary embodiment of the present disclosure wherein the receiving network interface is configured to reject the communications packet in response to not successfully decoding the message authentication code.

In accordance with another aspect of the exemplary embodiment of the present disclosure wherein the receiving network interface is configured to perform at least one of an ingress network filtering and a hardware counter and to reject a packet from a sender in response to a number of packets from the sender exceeding a threshold value.

In accordance with another aspect of the exemplary embodiment of the present disclosure wherein the message authentication code is generated and decoded using a message authentication code key and wherein the message authentication code key is shared between the sending network interface and the receiving network interface via an alternate communications network during an establishment of a data connection between the sending network interface and the receiving network interface.

In accordance with another aspect of the exemplary embodiment of the present disclosure wherein the message authentication code further includes a bit indicative of a payload encryption and wherein the data forms a portion of a payload.

In accordance with another aspect of the exemplary embodiment of the present disclosure, a method for communicating a data within a vehicle data network including generating, by a first processor, a data in response to a first vehicle control algorithm, receiving, by a first network interface, the data from the first processor, generating, by the first network interface, a message authentication code in response to the data, generating, by the first network interface, a communications packet for transmission according to a remote direct memory access network protocol wherein the message authentication code is appended to the communications packet, transmitting the communications packet by the first network interface to a second network interface via a communications network, and decoding the message authentication code, by the second network interface, to extract the data, coupling, by the second network interface, the data to a memory, and storing the data by the memory wherein the memory is communicatively coupled to a second processor performing a second vehicle control algorithm.

In accordance with another aspect of the exemplary embodiment of the present disclosure wherein the message authentication code forms a portion of a secure remote direct memory access network header within the communications packet.

In accordance with another aspect of the exemplary embodiment of the present disclosure wherein the message authentication code replaces a plurality of checksums within the communications packet.

In accordance with another aspect of the exemplary embodiment of the present disclosure further including generating a 64 bit freshness counter and wherein the message authentication code is generated in response to 24 least significant bits of the 64 bit freshness counter.

In accordance with another aspect of the exemplary embodiment of the present disclosure wherein the second network interface is configured to write the data to a memory location within the memory without interrupting the second processor.

In accordance with another aspect of the exemplary embodiment of the present disclosure wherein the first processor and the first network interface are components of a first server and wherein the second processor, the memory and the second network interface are components of a second server and wherein the first server and the second server are communicatively coupled via the communications network.

In accordance with another aspect of the exemplary embodiment of the present disclosure wherein the message authentication code is generated in response to a message authentication code key and wherein the message authentication code key is established in a handshake between the first network interface and the second network interface during an initialization of a remote direct memory access between the first network interface and the second network interface.

In accordance with another aspect of the exemplary embodiment of the present disclosure wherein the communications packet includes a base transport header including an unencrypted queue pair number, an unencrypted packet sequence number and a type of remote direct memory access network request.

In accordance with another aspect of the exemplary embodiment of the present disclosure wherein the communications packet includes an unencrypted routing header, an unencrypted base transport header, a payload, a checksum, and an unencrypted remote direct memory access including a target virtual address, a memory key, a data length and the message authentication code.

In accordance with another aspect of the exemplary embodiment of the present disclosure, a vehicle communications network including a first processor configured to perform a first vehicle control algorithm and to generate a data in response to the first vehicle control algorithm, a first network interface to receive the data from the first processor, to generate an encrypted data in response to the data and a first key, to generate a remote direct memory access compliant data packet, to append the encrypted data to the remote direct memory access compliant data packet to generate a secure remote direct memory access compliant data packet and to transmit the secure remote direct memory access compliant data packet via a communications network, a second network interface configured to receive the secure remote direct memory access compliant data packet, to decode the encrypted data to extract the data and to couple the data to a memory, the memory configured to receive the data and to store the data in a designated memory location, a second processor configured to access the designated memory location to retrieve the data, to perform a second vehicle control algorithm in response to the data, and to generate a control signal in response to a result of the second vehicle control algorithm, and a vehicle controller configured to control a vehicle in response to the control signal.

In accordance with another aspect of the exemplary embodiment of the present disclosure wherein the encrypted data is appended to the remote direct memory access compliant data packet to replace at least one of a checksum and a remote direct memory access header.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

In a motor vehicle application, where malicious actors can have physical access to a vehicle's communication network, RDMA's bypass of traditional operating system security controls introduces vulnerabilities, as malicious actors on the network could potentially leverage in-flight Datagram (IRD) attacks to inject unauthorized data directly into target memory, bypassing CPU checks and potentially compromising system integrity or causing Denial-of-Service (DOS) attacks. This increased attack surface necessitates robust authentication mechanisms and fine-grained access control measures to mitigate these risks. These mechanisms are required to ensure proper access control, ensure integrity and/or confidentiality of RDMA Messages, and to defend against DOS attacks on RDMA Network Interface Controllers (NIC's).

Figure 1:
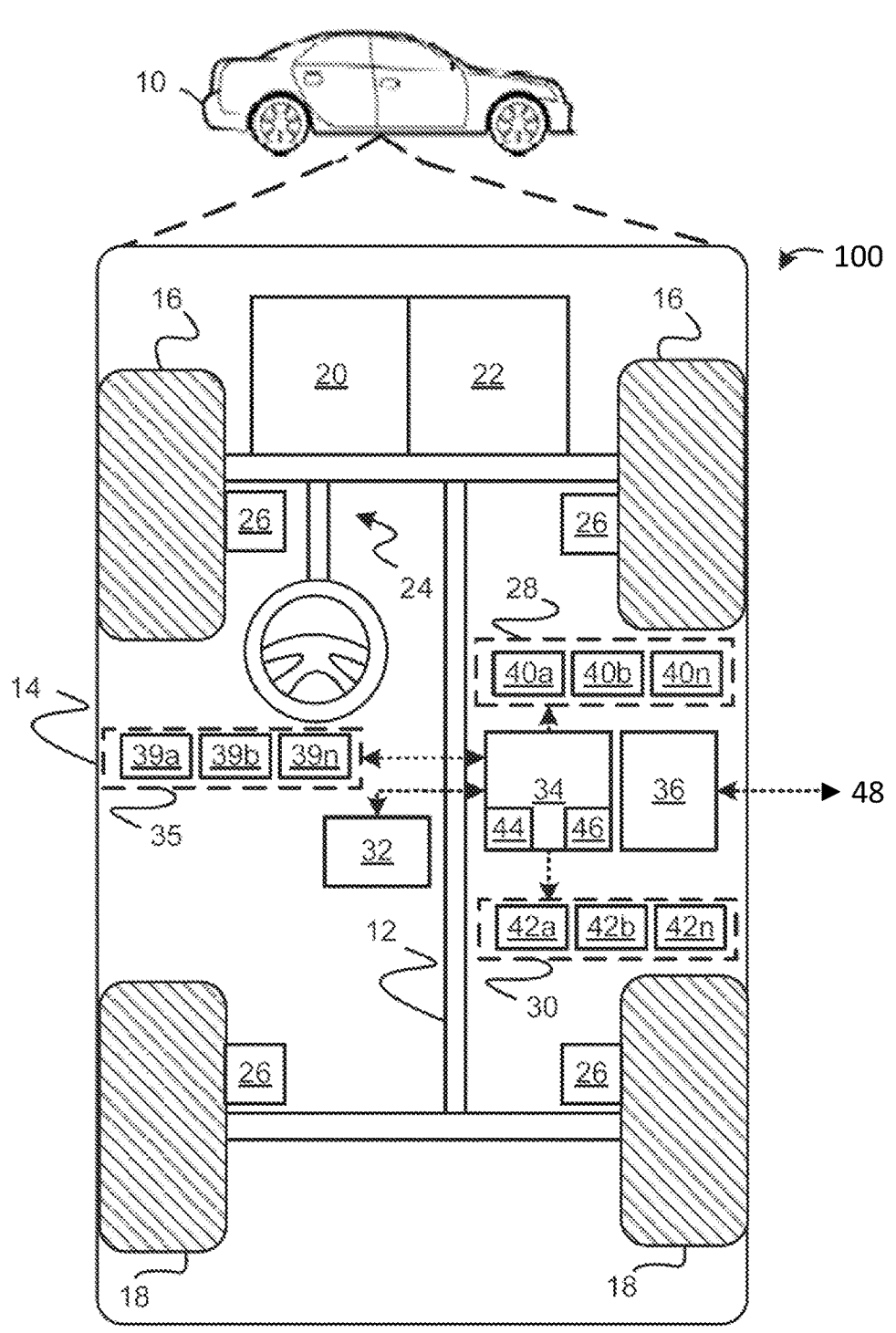
FIG. 1 is a functional block diagram of a vehicle that includes an exemplary system for providing secure RDMA for low latency real time applications is shown in accordance with embodiments of the present disclosure.

Turning now to FIG. 1, an exemplary system 100 for providing secure RDMA for low latency real time applications in a motor vehicle is shown in accordance with various embodiments. The exemplary system 100 includes a vehicle 10 having a plurality of sensing devices 40a-40n, a propulsion system 20, a transmission system 22, a steering system 24, a brake system 26, a sensor system 28, an actuator system 30, at least one data storage device 32, at least one controller 34, and a communication system 36.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle 10 may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In various embodiments, the sensing devices 40a-40n are disposed at different locations of the vehicle 10. In exemplary embodiments described herein, one or more of the sensing devices 40-40n are realized as lidar devices. In this regard, each of the sensing devices 40a-40n may include or incorporate one or more lasers, scanning components, optical arrangements, photodetectors, and other components suitably configured to horizontally and rotatably scan the environment in the vicinity of the vehicle 10 with a particular angular frequency or rotational velocity. In exemplary embodiments described herein, one or more of the sensing devices 40a-40n are realized as optical cameras configured to capture images of the environment in the vicinity of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, personal devices, and or calibration stations. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. In various embodiments, the data storage device 32 stores calibrations for use in aligning the sensing devices 40a-40n. In various embodiments, one or more of the calibrations are estimated as extrinsic parameter using the methods and systems described herein. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In various embodiments, one or more instructions of the controller 34 are embodied in the control system 100 and, when executed by the processor 44, cause the processor 44 to perform the methods and systems that dynamically align the sensor devices by updating calibrations stored in the data storage device 32 as described in greater detail below.

In accordance with various embodiments, the controller 34 implements an autonomous driving system (ADS). Software and/or hardware components of the controller 34 (e.g., processor 44 and computer-readable storage device 46) are utilized to provide an autonomous driving system that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, the autonomous driving system can include a computer vision system, a positioning system, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 receives information from and/or implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

According to some exemplary embodiments, the control system shown generally at 100 is associated with a vehicle 10. In general, the control system 100 selectively aligns two sensors of the vehicle 10 by estimating extrinsic parameters. As will be discussed in more detail, the estimating is based on a method that utilizes a mathematical optimization problem given a group of Lidar-camera control points with a highly flexible 3D-2D correspondence requirement. In various embodiments, the two sensors include a lidar sensor and a camera sensor. As can be appreciated, other sensors can be implemented in various embodiments.

According to some exemplary embodiments, the plurality of sensing devices 40a-40n, the propulsion system 20, the transmission system 22, the steering system 24, the brake system 26, the sensor system 28, the actuator system 30, the at least one data storage device 32, the at least one controller 34, and the communication system 36 are communicatively coupled to transmit data between one another. In some exemplary embodiments, the various components of the exemplary system 100 can transmit data via a a a vehicle network of a vehicle bus using an enhanced security RDAM protocol as described in further detail with regard to FIG. 2

Figure 2:
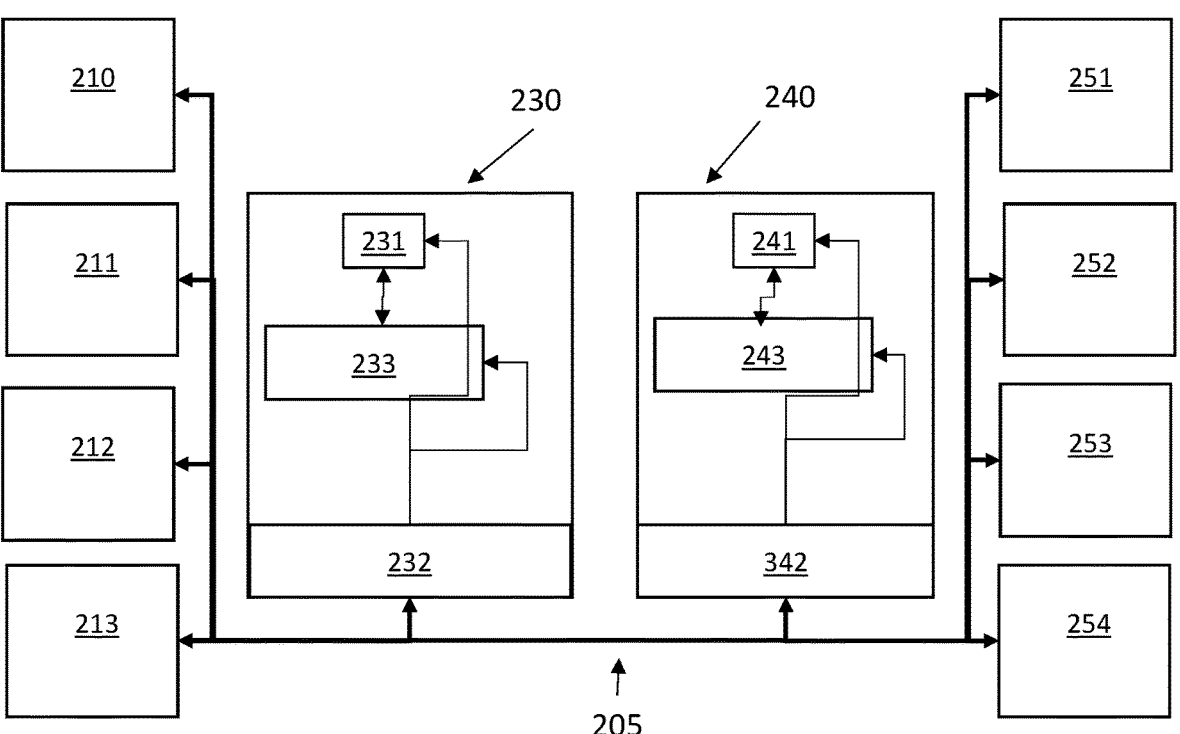
FIG. 2 is illustrative of a block diagram illustrating an exemplary implementation of a system for providing secure RDMA for low latency real time applications in a motor vehicle according to an exemplary embodiment of the present disclosure.

Turning now to FIG. 2, a block diagram illustrating an exemplary implementation of a system 200 for providing secure RDMA for low latency real time applications in a motor vehicle is shown. The exemplary system 200 can include a first server 230, a second server 240, a first plurality of devices 210, 211, 212, 213, and a second plurality of devices 251, 252, 253, 254 communicatively coupled via a data network 205. The first plurality of devices 210, 211, 212, 213, and the second plurality of devices 251, 252, 253, 254 can include any sensor, such as inertial measurement unit (IMU), cameras, LiDARs, radars, ultrasonic sensors, temperature sensors, ranging sensors, occupancy sensors, set position sensors, or the like, which generate data to be supplied to the first server 230 and/or the second server 240 for performing vehicle operations and algorithms. Likewise, the first plurality of devices 210, 211, 212, 213, and the second plurality of devices 251, 252, 253, 254 can include any actuator, motor or motor controller, steering controller, brake controller, or other vehicle device receiving data from the first server 230 and/or the second server 240 for performing vehicle operations and algorithms.

In some exemplary embodiments, each of the first server 230 can include a first processor 231, a first memory 233, and a first NIC 232. The second server 240 can include a second processor 241, a second memory 243, and a second NIC 342. The first NIC 232 and the second NIC 242 can communicate data through RDMA packets transmitted via the data network 205. Each of the first NIC 232 and the second NIC 242 are enabled with RDMA capabilities.

Traditional data transfer protocols like TCP/IP rely on the server CPU for handling data packets, introducing overhead and latency. RDMA bypasses this by enabling direct communication between application memory on separate servers. Applications performed by the first processor 231 and the second processor 241 can leverage RDMA application programming interfaces (APIs) to directly access remote memory locations. RDMA NICs 232, 242 handle data transfer and communication protocols, offloading the CPU. This "kernel bypass" significantly reduces latency as the CPU isn't involved in every step. RDMA facilitates zero-copy transfers, meaning data isn't copied between different memory areas during transfer. The data is transferred directly from the source application's memory to the destination application's memory. This eliminates unnecessary data copies, further improving performance.

RDMA with remote writes and reads, enables a sending server direct memory access on the receiving server. The sending application can directly read or write data from/to the remote server's memory without involving the remote CPU. It should be noted that RDMA is not a replacement for TCP/IP, but rather a specialized protocol for high-performance data transfers.

In the current RDMA standard a NIC can receive an RDMA packet as long as the queue pair number (QPN) and target virtual address are part of the same protection domain, the packet sequence number (PSN) is greater than values seen in previously received packets, and the RDMA memory key (RKEY) access token matches the target virtual address. In standard RDMA applications, these conditions are easy to achieve by an attacker by monitoring the network Rkeys, QPNs, and allocated virtual memory locations as they are usually implemented in a predictable way and sent in the clear in RDMA packets, PSN's are sequential numbers, also sent in the clear. It is desirable to overcome the aforementioned problems to provide a packet format conforming to existing RDMA standards while including mechanisms to ensure proper access control, ensuring integrity of the RDMA messages and defending against DoS on the NICs.

To overcome the aforementioned RDMA security issues, the exemplary system 200 can harden RDMA access control by binding the region in a server's memory to a message authentication code key (MAC Key), Rkey, and access type, rather than binding a region only to an Rkey as is done in the current RDMA standard. The sending NIC 232 can be configured to use a previously provisioned MAC Key, shared with the receiver, to generate a Message Authentication Code (MAC) on the outgoing RDMA packet. The sending NIC 232 can also be configured to encrypt the payload of the RDMA packet if applicable using a previously provisioned Encryption Key, shared with the receiver. The receiving NIC 243 can be configured to use with a MAC Key used to verify MAC and decrypt the RDMA payload when applicable. In addition, the exemplary system 200 can set the RDMA packet format to include a MAC inserted in the RDMA header or can replace the RDMS CRC with the MAC. The exemplary system 200 can be configured to maintain a 64-bit anti-replay counter from which the PSN is derived and for updating the anti-replay counter when PSN wraps around, and for updating the anti-replay counter when an RDMA session ends. The system 200 can periodically synchronize the anti-replay counter between the sender and receiver. In addition, the exemplary system 200 can be configured to perform a method for detecting DOS attacks based on hardware counters and ingress network filtering and for integrating security peripherals into the first NIC 232 and the second NIC 242 to enable efficient implementation of these security features without interrupting the first processor 231 or the second processor 241.

Figure 3:
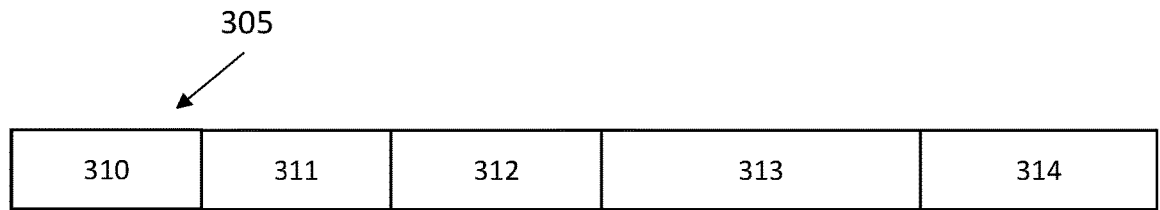
FIG. 3 is illustrative of an exemplary implementation of a plurality of RDMA packet structures for providing secure RDMA for low latency real time applications in a motor vehicle in accordance with embodiments of the present disclosure.
Figure 3:
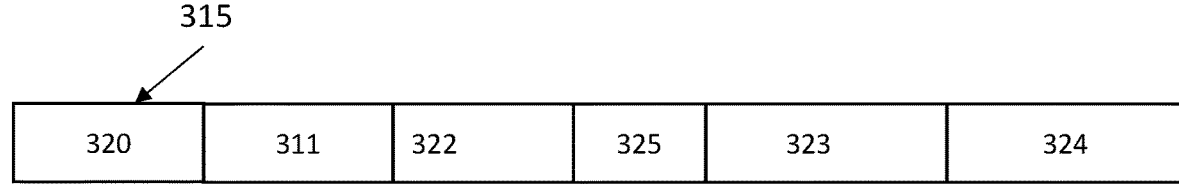
Figure 3:
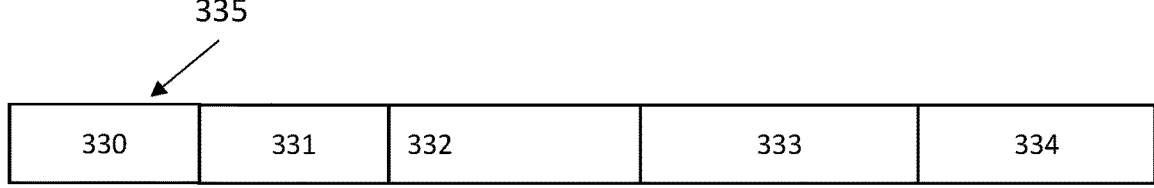

Turning now to FIG. 3, a diagram illustrating an exemplary implementation of a plurality of RDMA packet structures for providing secure RDMA for low latency real time applications in a motor vehicle in accordance with embodiments of the present disclosure is shown.

According to the current RDMA, a first RDMA packet 305 is shown having a routing header 310, a base transport header 311, an RDMA header 312, a payload 313 and a plurality of integrity CRC checksums 314. The base transport header 311 includes the QPN and PSN and the type of RDMA request. The RDMA header 312 includes the target virtual address, the memory key (rkey) and the data length. The checksums 314 can include two integrity CRC checksums. The receiver NIC will accept the RDMA packet as long as the QPN and target virtual address are part of same protection domain, the PSN is greater than values seen in previously received packets and the rkey access token matches target virtual address. However, these conditions are easy to achieve by a malicious actor monitoring with physical access to the network. Rkeys, QPNs, and allocated virtual memory locations are usually implemented in a predictable way and sent in the clear in RDMA packets. PSNs are sequential number, also sent in the clear.

To enforce proper access control on incoming RDMA packets, a receiving NIC uses the RKey enclosed in the packet to locate the appropriate access control rules in an allow list that apply to the incoming packet and determines the correct MAC Key that should be used to authenticate the incoming packet. After verifying the validity of the combination of Rkey, QPN, and Target memory region, a receiver NIC the checks if the requested access type for target memory region is authorized for the Rkey enclosed in the RDMA packet. If this is the case, the receiver proceeds to verifying the MAC, otherwise it drops the received RDMA packet.

To ensure an RDMA packet originates from an authorized device and has not been altered in flight, a MAC can be generated and transmitted within the RDMA packet. The MAC is an alphanumeric string, or binary sequence, of a predetermined length that can only be generated by devices holding the secret MAC Key. The MAC Key is provisioned to the appropriate devices in a secure protocol. The MAC generation algorithm takes as input the data to be transmitted, the anti-rollback counter, and the MAC Key. The transmitting server employs the MAC generation algorithm with the MAC key to generate a MAC tag. Both the data and the generated MAC tag are transmitted to the receiver. Upon receiving the data and the tag, the receiver utilizes the same cryptographic algorithm and the shared MAC key to recreate the MAC tag for the received data. The receiving server then compares the recreated MAC tag with the received tag to ensure the integrity of the data.

In some exemplary embodiments, a first exemplary RDMA packet 315 can include the MAC tag 325 appended to the RDMA header 322. The appended MAC can cover the routing header 320, the base transport header 311, the RDMA header 322 and the payload 323 if applicable. The receiving NIC can verify the MAC tag using the MAC algorithm, the MAC key, the payload and a counter. In some embodiments, the MAC Key can be specific to a region and access type. Therefore, if the transmitting server has the key, then it must be authorized to access the target region with that specific type of access. Contrast this to a setting where the same Key is used for multiple regions with a different type of access for each region. In some exemplary embodiments, a public key signature can be appended to the RDMA Header instead of a MAC tag. Alternatively, a second exemplary RDMA packet 335 can replace the checksum values with the MAC tag 334, where the MAC can cover the routing header 320, the base transport header 311, the RDMA header 322 and the payload 323, if applicable.

In some exemplary embodiments, The MAC key as well as the encryption key can be derived from a long term pairing key established in a handshake between the sender and receiver the first time the sender starts an RDMA session with the receiver. The long term pairing key can be exchanged out-of-band using transport layer security (TLS), Bluetooth, or any other secure channel. When the payload contains confidential information, the payload can be encrypted with the encryption key. AES-256 can be used in Galois/Counter Mode (GCM) for authenticated encryption, or the Galois message authentication code (GMAC) or cipher-based message authentication code (CMAC) mode when encryption is not needed.

In some exemplary embodiments, MAC keys can be stored in each of the NICs during a key provisioning phase in a secure manufacturing environment. Once the vehicle network is activated, the first time an RDMA sender tries to register with an RDMA receiver, a session key establishment procedure will be triggered using an out-of-bound (OOB) protocol. Once the key is established, it can be stored at the sending NIC and the receiving NIC and becomes accessible to the RDMA logic for authentication, encryption, and access control purposes.

In order to ensure integrity and/or confidentiality, the MAC can include a freshness counter to prevent replay attacks. For example, a 64 bit freshness counter can be used in the MAC and the 24 least significant bits can be included in the base transport header 311. To keep legitimate sender and receiver in sync on the freshness counter, the sender can send a synch message every 223 RDMA packets which is the half period of the PSN or at the start of a new file transfer. In some exemplary embodiments, the synch message can include an encryption of the full 64-bit freshness counter. A separate freshness counter can be maintained for each sender in the network.

In some exemplary embodiments, setting and managing the freshness counter in the MAC can include that each time the 24 bit PSN wraps around, or once the RDMA request has been completed, the 40 most significant bits of the full freshness counter can be incremented by 1. This incrementation is advantageous as the RDMA standard uses 24 bit PSM only to keep track of packets within a segmented message. Once the exchange completes, the 24 bit PSN is reset to zero. In order to remain compatible with the current RDMA standard and still prevent replay attacks the 64 bit freshness counter can be set to 40 bit MSB plus 1 with 24 trailing zeros when the RDMA exchange is complete. In some exemplary embodiments, the authentication and encryption of RDMA packets can be performed using public key cryptography instead of symmetric key cryptography.

In order to defend against DOS attacks, the RDMA NICs can be configured with hardware counters to detect a resource exhaustion and brute force attacks. Ingress network filtering can be used to detect adversaries sending RDMA requests with spoofed IP addresses or network IDs. Provisioning each receiving NIC with its own security peripheral allows the NIC to operate independently from the CPU and maintain typical RDMA efficiency and security.

Figure 4:
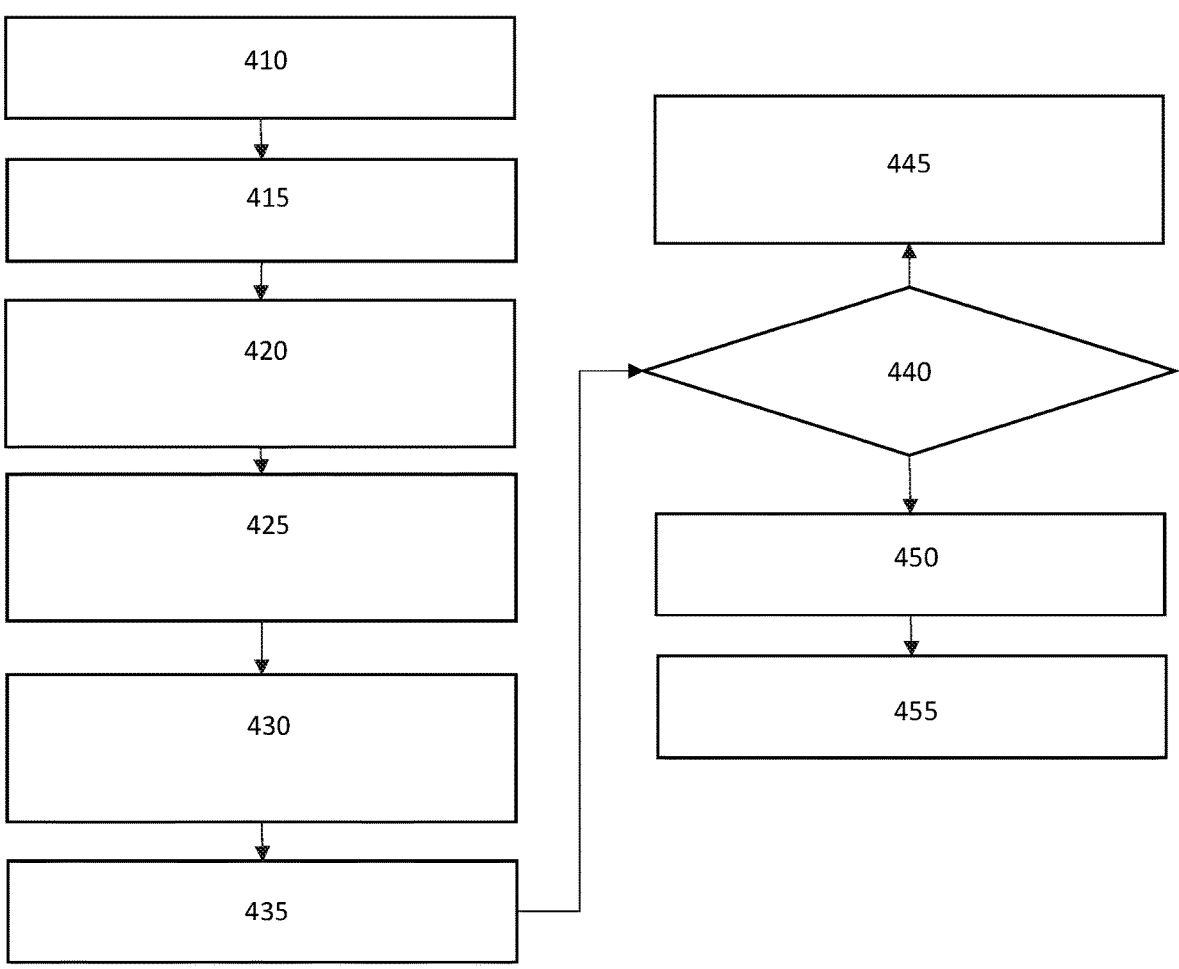
FIG. 4 shows a flow chart illustrating an exemplary implementation of a method for providing secure RDMA for low latency real time applications in a motor vehicle in accordance with embodiments of the present disclosure.

Turning now to FIG. 4, a flow chart illustrating an exemplary implementation of a method 400 for providing secure RDMA for low latency real time applications in a motor vehicle is shown. The method is first operative to receive data by a transmitting NIC from a sending processor. In some exemplary embodiments, the sending processor can form part of a cloud computing application and can be transmitting data to a memory location on a second server within a computing network.

In response to receiving the data from the sending processor, the method is next operative to generate 415 a MAC using a cryptographic algorithm using a MACkey and the data received from the sending processor. The method then generates a secure RDMA packet in response to the MAC. The secure RDMA packet has a format similar to a standard RDMA packet to ensure backwards compatibility, with the MAC is appended to the RDMA header. Alternatively, the MAC can replace the CRC values within the RDMA packet. The MAC and the secure RDMA packet can be generated by a transmitting NIC communicatively coupled to a computing network.

The method next transmits 425 the secure RDMA packet to the second server within the computing network via a communications bus or the like. In some exemplary embodiments, the communications network can be a CAN bus or an ethernet network. The secure RDMA packet is next received 430 by a receiving NIC integral to the second server. The receiving NIC next verifies that the received rKey is authorized to access the requested memory region with the requested access type and then verifies 435 the MAC using the cryptographic algorithm and a MAC key identical to the MAC key used to the transmitting NIC. The MAC keys can be derived from a long term pairing keys established by the transmitting NIC and receiving NIC using a secure out-of-band communication channel such as transport layer security (TLS), Bluetooth, or any other secure channel.

If the MAC verification is successful 440, the method next extracts 450 the original data as was received by the transmitting NIC from the sending processor. The method then stores the data in a designated memory location within the second server. If the MAC decode is not successful 440, the RDMA packet is rejected 445.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle communications system comprising:
a sending processor for generating a data in response to a first vehicle control algorithm;
a sending network interface configured to receive the data from the sending processor, to generate a message authentication code in response to the data, to generate a communications packet for transmission according to a remote direct memory access network protocol, wherein the message authentication code is appended to the communications packet, and to transmit the communications packet via a communications network;
a receiving network interface configured to receive the communications packet from the sending network interface via the communications network, to decode the message authentication code to extract the data, and to couple the data to a memory; and
the memory configured to store the data for use by a receiving processor performing a second vehicle control algorithm.

2. The vehicle communications system of claim 1 wherein the message authentication code replaces a portion of a remote direct memory access header within the communications packet.

3. The vehicle communications system of claim 1 wherein the message authentication code replaces a plurality of checksums within the communications packet.

4. The vehicle communications system of claim 1 wherein the message authentication code is further generated in response to a freshness counter and wherein the receiving network interface is further configured to extract the freshness counter in response to decoding the message authentication code.

5. The vehicle communications system of claim 1 wherein the message authentication code is generated in response to a first key, a routing header, a base transport header, a remote direct memory access header and the data.

6. The vehicle communications system of claim 1 wherein the receiving network interface is configured to reject the communications packet in response to not successfully decoding the message authentication code.

7. The vehicle communications system of claim 1 wherein the receiving network interface is configured to perform at least one of an ingress network filtering and a hardware counter and to reject a packet from a sender in response to a number of packets from the sender exceeding a threshold value.

8. The vehicle communications system of claim 1 wherein the message authentication code is generated and decoded using a message authentication code key and wherein the message authentication code key is shared between the sending network interface and the receiving network interface via first server alternate communications network during an establishment of a data connection between the sending network interface and the receiving network interface.

9. The vehicle communications system of claim 1 wherein the message authentication code further includes a bit indicative of a payload encryption and wherein the data forms a portion of a payload.

10. A method for communicating a data within a vehicle data network comprising:
generating, by a first processor, a data in response to a first vehicle control algorithm;
receiving, by a first network interface, the data from the first processor;
generating, by the first network interface, a message authentication code in response to the data;
generating, by the first network interface, a communications packet for transmission according to a remote direct memory access network protocol wherein the message authentication code is appended to the communications packet;
transmitting the communications packet by the first network interface to a second network interface via a communications network; and
decoding the message authentication code, by the second network interface, to extract the data;
coupling, by the second network interface, the data to a memory; and
storing the data by the memory wherein the memory is communicatively coupled to a second processor performing a second vehicle control algorithm.

11. The method for communicating a data within a vehicle data network of claim 10 wherein the message authentication code forms a portion of a secure remote direct memory access network header within the communications packet.

12. The method for communicating a data within a vehicle data network of claim 10 wherein the message authentication code replaces a plurality of checksums within the communications packet.

13. The method for communicating a data within a vehicle data network of claim 10 further including generating a 64 bit freshness counter and wherein the message authentication code is generated in response to 24 least significant bits of the 64 bit freshness counter.

14. The method for communicating a data within a vehicle data network of claim 10 wherein the second network interface is configured to write the data to a memory location within the memory without interrupting the second processor.

15. The method for communicating a data within a vehicle data network of claim 10 wherein the first processor and the first network interface are components of a first server and wherein the second processor, the memory and the second network interface are components of a second server and wherein the first server and the second server are communicatively coupled via the communications network.

16. The method for communicating a data within a vehicle data network of claim 10 wherein the message authentication code is generated in response to a message authentication code key and wherein the message authentication code key is established in a handshake between the first network interface and the second network interface during an initialization of a remote direct memory access between the first network interface and the second network interface.

17. The method for communicating a data within a vehicle data network of claim 10 wherein the communications packet includes a base transport header including an unencrypted queue pair number, an unencrypted packet sequence number and a type of remote direct memory access network request.

18. The method for communicating a data within a vehicle data network of claim 10 wherein the communications packet includes an unencrypted routing header, an unencrypted base transport header, a payload, a checksum, and an unencrypted remote direct memory access including a target virtual address, a memory key, a data length and the message authentication code.

19. A vehicle communications network comprising:
  a first processor configured to perform a first vehicle control algorithm and to generate a data in response to the first vehicle control algorithm;
  a first network interface to receive the data from the first processor, to generate an encrypted data in response to the data and a first key, to generate a remote direct memory access compliant data packet, to append the encrypted data to the remote direct memory access compliant data packet to generate a secure remote direct memory access compliant data packet and to transmit the secure remote direct memory access compliant data packet via a communications network;
  a second network interface configured to receive the secure remote direct memory access compliant data packet, to decode the encrypted data to extract the data and to couple the data to a memory;
  the memory configured to receive the data and to store the data in a designated memory location;
  a second processor configured to access the designated memory location to retrieve the data, to perform a second vehicle control algorithm in response to the data, and to generate a control signal in response to a result of the second vehicle control algorithm;
  a vehicle controller configured to control a vehicle in response to the control signal.

20. The vehicle communications network of claim 19, wherein the encrypted data is appended to the remote direct memory access compliant data packet to replace at least one of a checksum and a remote direct memory access header.

* * * * *